March 24, 1942.　　　L. E. BAYNES　　　2,277,625
AIRCRAFT INSTRUMENT
Filed March 5, 1941
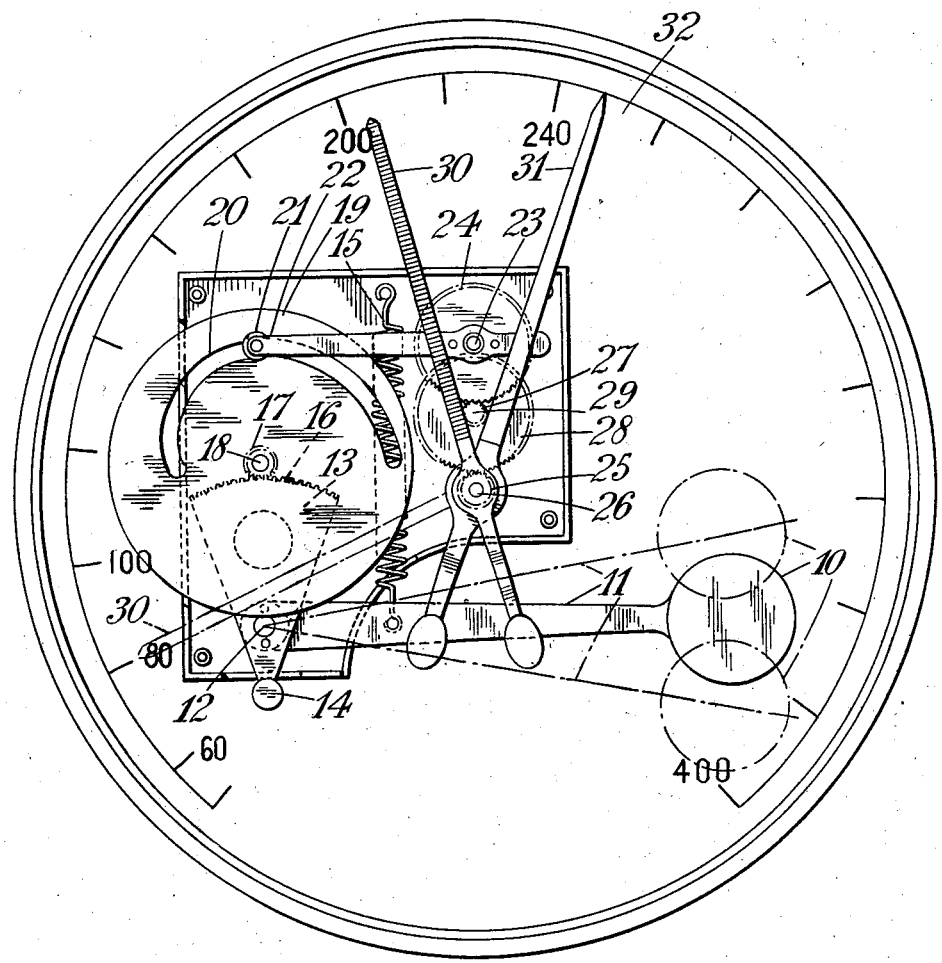
Inventor:
Leslie Everett Baynes,
By Stebbins & Blenko,
Attys Patented Mar. 24, 1942

2,277,625

UNITED STATES PATENT OFFICE 2,277,625

AIRCRAFT INSTRUMENT

Leslie Everett Baynes, Iver Heath, England, assignor to Alan Muntz & Company Limited, Hounslow, Middlesex, England, a British company Application March 5, 1941, Serial No. 381,923
In Great Britain February 20, 1940

5 Claims. (Cl. 73—152)

This invention comprises improvements in aircraft instruments and it is an object of the invention to provide an instrument which will indicate to the pilot the stalling speed and the change of the stalling speed under varying conditions.

The stalling speed of any particular aircraft is a determinable quantity for the case of steady flight and it is usually marked up somewhere in the cockpit within view of the pilot, and the latter is careful to fly at a safe margin above this speed. The bare statement of this speed, however, is misleading because when an aircraft is pulling out of a dive or is turning with a steep angle of bank the stalling speed is not the same as when the craft is in steady flight.

The reasons for this are as follows:

As is well known the stalling speed of an aircraft is proportional to the square root of the wing loading. When turning sharply or pulling out of a dive the wing loading is considerably increased and therefore the stalling speed is also increased. Considered mathematically, if $g$ represents the force exerted by gravity per unit of mass and $a$ represents the force exerted per unit of mass by acceleration forces due to turning or pulling out of a dive, the total force per unit of mass which is to be borne by the aerofoil surfaces of the craft is the vector sum of $g$ and $a$, and this may be called G. Since the wing loading is proportional to G the stalling speed is proportional to the square root of G.

Thus, a high speed aircraft making a small radius turn, necessitating a steep angle of bank, may have a value for G which is as much as six times $g$, during the turn. The stalling speed therefore during the turning manoeuvre will in this case be increased in the proportion of $\sqrt{6}=2.45$ times normal stalling speed (flaps up). This is equivalent on a modern aircraft to about 200 miles per hour, and as the flying speed may not be much above this figure there is the danger of a stall taking place on the inner wing; that is to say, the one on the inside of the radius, which is flying more slowly relatively to the air than the average speed of the craft. The machine may therefore turn into a spin without any warning.

The same thing may happen when pulling out of a dive, that is to say, the stalling speed may increase two or three times the normal value due to the increase in the value of G. The result may be that instead of pulling out of the dive the machine will stall and hit the ground or sea.

It is, therefore, very desirable that the pilot should have some means of knowing what his stalling speed actually is when any particular manoeuvre is being carried out.

According to the present invention a stalling speed indicator comprises a mass which is movable under the combined effects of gravity and additional acceleration due to manoeuvring the craft, a device to apply a controlling force tending to counteract movement of the mass and means to indicate the extent of movement of the mass thereby giving readings which are a function of G.

The indicator may serve to give readings on any particular aircraft, which may be graduated to read directly in terms of the stalling speed.

Preferably, characteristics of the control for the mass and of the indicating means are such as to give a scale of readings which is uniformly spaced for uniform increments of stalling speed. In such a case it becomes possible to combine the stalling speed indicator of this invention with the usual air speed indicator of the craft. This may be effected by utilising as the stalling speed indicator a pointer which is concentric with the air speed indicator and moves over the same scale thereby giving an easily visible indication to the pilot of the margin of speed which he has in his actual flying speed over and above the prevailing stalling speed.

In order that the invention may be more clearly understood one preferred construction will now be described with the aid of the accompanying drawing which diagrammatically represents the various parts necessary in a stalling speed indicator according to this invention.

A small weight 10 is carried at the end of an arm 11 which is rigidly connected at 12 to a sector 13. The latter is free to turn about a pivot 14 so that the weight 10 is free to move substantially in a vertical direction when the craft is flying horizontally on an even keel. The weight is sustained against downward movement by a helical tension spring 15 and will move up or down in accordance with the value of G. Sector 13 has teeth 16 at its periphery which mesh with a pinion 17 rotating on a fixed spindle 18. Secured to rotate in company with the pinion 17 is a cam plate 19 having formed in it a cam slot 20. Engaged in the slot is a cam follower 21 comprising a small wheel rotatably mounted on the end of lever 22. The latter is mounted on a spindle 23 to turn about the axis of that spindle in company with a spur wheel 24. The latter drives a pinion 25 rotatable with a spindle 26 through the intermediary of a pinion 27 and spur wheel 28 both mounted to rotate about the axis of a spindle 29.

Rotatable with pinion 25 is a pointer 30 friction-tight upon the spindle 26 constituting the stalling speed indicator and the shape of cam 20 is such that movement imparted to the pointer 30 through the gearing just described will be proportional to the square root of the movement of weight 10.

The stalling speed indicator 30 is preferably mounted concentrically with the customary air speed indicator 31 and the strength of spring 15 is made such that the speed indications of pointer 30 will coincide with the indications of the air speed scale 32 with which indicator 31 normally co-operates.

Pointer 30 is preferably coloured differently from indicator 31 so as readily to distinguish between the two. For example, pointer 30 may be coloured red and so shaped as to represent a line visible to the pilot rather than a pointer. If the instrument is of the luminous type pointer 30 may have a luminous spout at its end to distinguish it from pointer 31 which will generally be luminous throughout the major portion of its length, or any other preferred means may be utilised to distinguish between the two pointers or indicators 30 and 31.

If the air speed indicator 31 moves back to a position in which it is coincident with the stalling speed pointer 30 this will show that the stalling speed has been reached and during the approach towards this superposition of the pointers the pilot is given an easily visible warning of the approaching danger of stalling.

The setting of the stalling speed indicator relatively to the scale and to its actuating mechanism is made adjustable by the friction-tight mounting of the pointer 30 so that it can be set, for any particular aircraft, at the known steady-flying stalling speed of the machine.

As is well known, if G reaches a high figure, which varies with different individuals, the pilot loses blood from the brain and therefore loses consciousness, which is known as "blacking out." It will be appreciated that the instrument described, in addition to giving indications of stalling speed, can be marked so as to give indications of the value of G. This G scale will give the pilot warning of the approach of "blacking out" conditions and also of the approach of the maximum permissible wing loading of the machine, wing loading being proportional to G.

Instead of the cam arrangement above described any other mechanism 19, 20, 21, 22 for converting the movement of the pointer from one proportional to the movement of the weight into one proportional to the square root of its movement can be used.

If the speed scale of the air speed indicator is not truly proportional to air speed, i. e. if the graduations vary in spacing from one part of the scale to another, the stalling speed indicator would need to be modified accordingly, but a truly linear scale is necessary if the instrument is to be used for different-type machines having different settings for stalling speed.

I claim:

1. In or for an aircraft the combination of an air speed indicator having an air speed scale and a pointer moving thereover, a stalling speed indicator mechanism having a mass movable under the combined effects of gravity and additional acceleration due to manoeuvring the craft, a device to apply a controlling force tending to counteract movement of the mass, a pointer having operative connections with said mass to indicate the extent of movement of the mass, which pointer is concentric with and works over the same scale as the air speed pointer, said device to apply a controlling force and said connections being such as to cause the stalling speed pointer to indicate stalling speed correctly on the air speed scale.

2. A stalling speed indicator as claimed in claim 1 in which the device to apply a controlling force to the mass comprises a spring tending to resist movement of the mass and said connections include a cam coupled to the mass to move with it, the shape of the cam being such as to impart to the pointer movement proportional to the square root of the distance moved by the mass.

3. A stalling speed indicator comprising in combination a stalling speed pointer, a mass rotatable about a fixed axis eccentric to itself, a cam rotatable about a second axis, gearing interconnecting the cam and the mass, a spring operatively connected to the mass to oppose movement thereof, a cam follower comprising a rotatable arm engaged with the cam and means operatively interconnecting the arm and said stalling speed pointer.

4. A stalling speed indicator as claimed in claim 3, wherein the cam is of such shape as to impart to the pointer movement proportional to the square root of the distance moved by the mass.

5. A stalling speed indicator as claimed in claim 3, wherein the cam is of such shape as to impart to the pointer movement proportional to the square root of the distance moved by the mass and wherein said indicator is mounted in an air speed indicator casing with the pointer concentric with an air speed pointer of the air speed indicator and the spring, mass, cam, cam follower, and connecting means are such that the stalling speed pointer indicates correctly upon the air speed scale.

LESLIE EVERETT BAYNES.